Oct. 16, 1956  C. H. HARRY ET AL  2,766,667
ACCELERATION RESPONSIVE OPTICAL AXIS DEPRESSOR
Filed Feb. 14, 1952  3 Sheets-Sheet 2

Inventors
Charles H. Harry
John S. Attinello
By
Walter S. Paul
Attorneys

United States Patent Office 2,766,667
Patented Oct. 16, 1956

2,766,667

ACCELERATION RESPONSIVE OPTICAL AXIS DEPRESSOR

Charles H. Harry, Washington, D. C., and John S. Attinello, Arlington, Va., assignors to the United States of America as represented by the Secretary of the Navy Application February 14, 1952, Serial No. 271,624

3 Claims. (Cl. 95—12.5)

(Granted under Title 35, U. S. Code (1952), sec. 266)

This invention pertains to improvements in devices for shifting, as depressing, the optical axis of a camera.

In our application Serial Number 250,776 we have discussed some of the problems that arise in attempting to photograph an aircraft discharged missile, e. g. a rocket, as it follows its trajectory to the target. In addition, it has been found that if a camera—electrically, manually or mechanically operated—has its optical axis in alignment with the flight path of the rocket at the instant of release when there is little or no aircraft pullout, only the first few frames portray the rocket, and the rocket is depicted near the bottom of each of these frames. This is due to two factors, which are first, the vertical component of force applied by the pull of gravity on the rocket which, after release, causes the rocket to start falling vertically downward while aircraft aerodynamic forces continue to overcome this component and secondly, the immediate rise of the airplane from its previous course of flight when the weight of the rocket is freed from the aircraft. Therefore, even when the pilot releases a rocket while flying straight and level and at constant speed (acceleration zero), the herein disclosed invention will shift the camera optical axis to photograph the rocket from the instant of release until it strikes its target, and photograph the rocket if not at the center of each frame, very close to it.

Accordingly, it is an object of this invention to provide an assembly as a part of, or as an attachment for an aircraft mounted camera, the purpose of which is to depress the optical axis of the camera in response to acceleration of the device, and to so construct the device that if there is no acceleration when the device is actuated, the optical axis will nevertheless be shifted a predetermined amount.

Another object of the invention is to provide a camera optical axis depressor which is actuated by an accelerometer, the latter being so arranged that the angular deflection of the camera optical axis is a function of the value of the acceleration of the depressor, except for the initial axis deflection which occurs under the zero acceleration conditions discussed previously.

And the final object of the invention to be specifically mentioned is to provide a normally closed latch holding the members having reflecting surfaces and the means of operating them, in a fixed position until occasion warrants the use of the aircraft camera.

Ancillary objects and features will become apparent in following the description of the illustrated embodiment of the invention, wherein Fig. 1 is a longitudinal sectional view of the device showing it secured to a diagrammatically illustrated standard aircraft carried camera;

Figure 1:
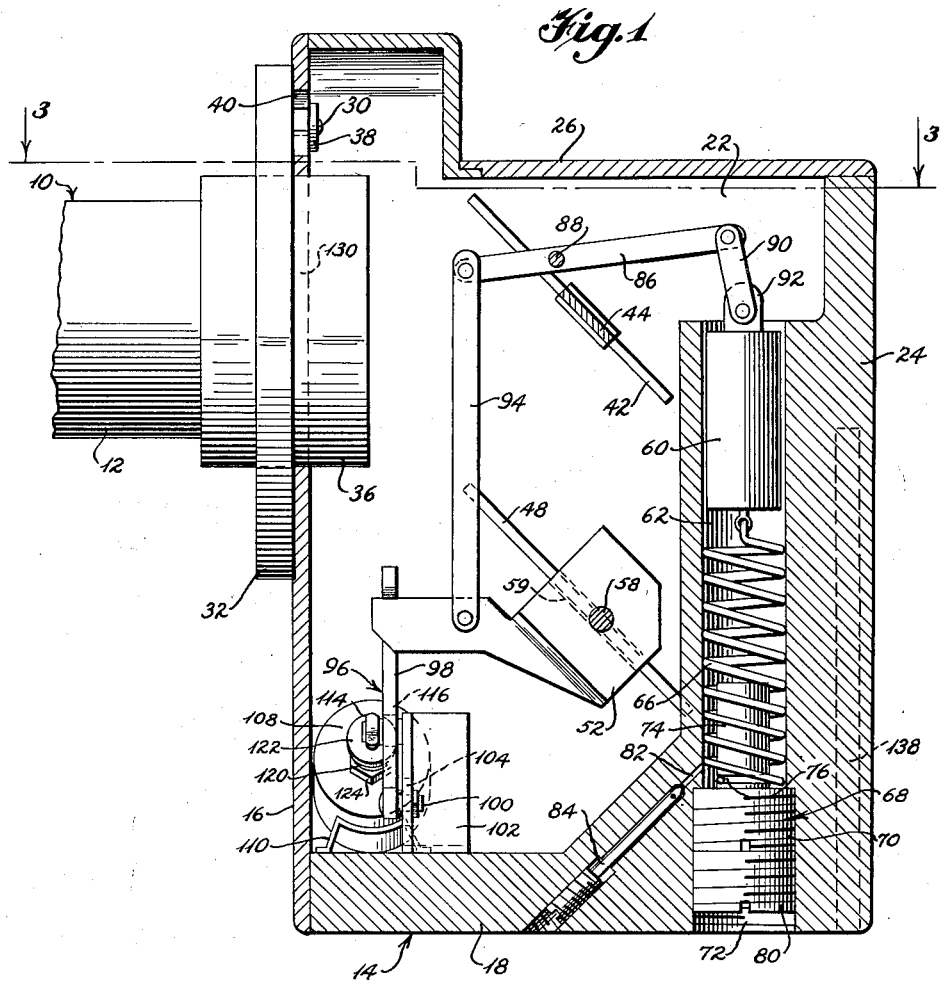
Figure 2:
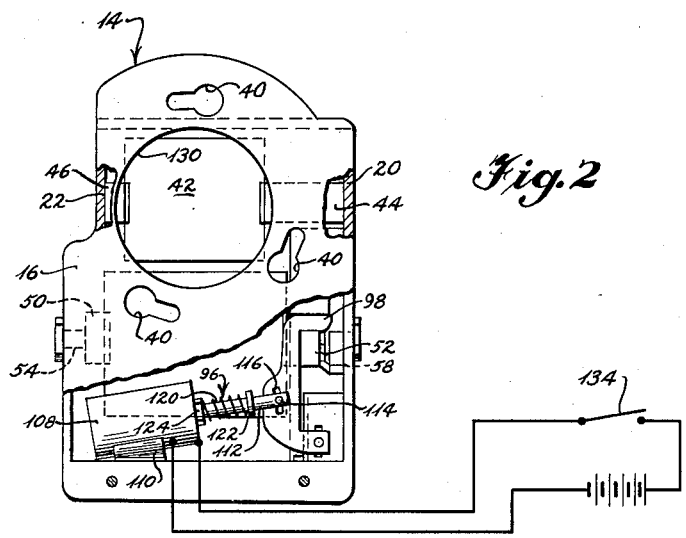
Fig. 2 is a rear elevational view of the device separated from the camera, parts being broken away to show internal structure.
Figure 3:
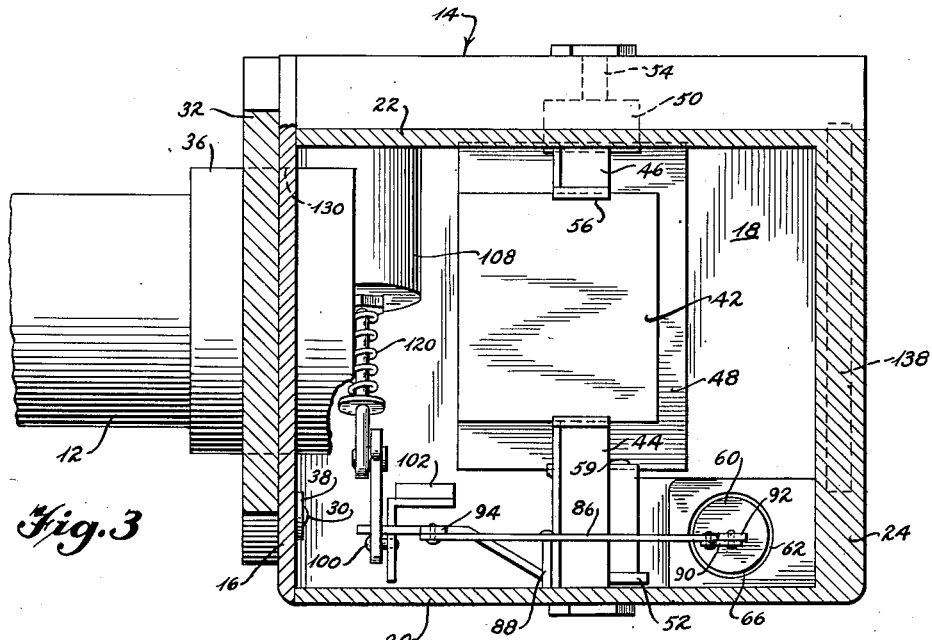
Fig. 3 is a transverse sectional view taken on the line 3—3 of Fig. 1 and in the direction of the arrows.

A camera 10 is fragmentarily shown, the camera barrel 12 thereof exemplifying the barrel of any known type of aircraft camera. The attachment for the camera 10 includes a casing or housing 14 having a back panel 16, a base 18, side walls 20 and 22, together with a front wall 24 and a cover 26. The component parts of the housing 14 are suitably fastened together, some being integrally connected and others being removably fastened, as by screws or other standard fastening means. A number of lugs 30 are provided on a locking ring 32 which is adapted to be fixed to a part of the aircraft or the camera barrel, the ring 32 having the lens shade 36 passed through the central opening thereof. The lugs have enlargements 38 on them which are capable of being passed through the larger parts of the keyhole slots 40, but not the smaller parts thereof. Since the keyhole slots 40 are formed in the back panel 16 of the housing, when the lugs are engaged with the slots 40 the housing 14 is held in a fixed position and in readiness for operation. This structure constitutes only one suggested means of removably mounting the housing, others being apparent, for example, the mounting means disclosed in our copending application may be used if found desirable.

A first light reflecting member 42, which may be a mirror or any member having a proper light reflecting surface or character, is fastened by brackets 44 and 46 to the side walls 20 and 22, the brackets holding the member 42 at a predetermined angularity with respect to the normal optical axis of the camera 10. A second light reflecting member 48 is mounted in the housing and has its light reflecting surface confronting the corresponding surface of the member 42. The member 48 is capable of being tilted or displaced in a pivotal manner, this being accomplished by the mounting means for the member 48. These mounting means comprise a pair of brackets 50 and 52, the bracket 50 having one end freely rotatable on the fixed pivot, as the pin 54, and the opposite end accommodating in its marginal pocket 56, one edge of the member 48. A second fixed pivot 58 is carried by the side wall 20 and is coaxial with the pivot 54 carried by the opposite housing wall. Inasmuch as the bracket 52 is mounted for rotation on pivot 58 and has an edge of the member 48 fixed in its marginal pocket 59 (or equivalent fastening means), the member 48 and its mounting brackets 50 and 52 are capable of tilting as a unit about the common axis of the fixed pivots 54 and 58.

Means for tilting the light deflecting member 48 are seen best in Fig. 1 and comprise a spring biased mass having an inertia element or mass 60 located in a cylinder 62, the latter being formed in the material of the housing or fastened in place, as found expedient from a production standpoint. Mass 60 and cylinder 62 are of similar size and shape, so as to provide a guiding action of the mass, with minimum friction, and with a piston and cylinder type action. Yielding means are provided to move the inertia element 60 in one direction a short distance and then resiliently oppose any further motion in the same direction. This is accomplished by fastening one end of a spring 66 to the inertia element 60, anchoring the opposite end of the spring 66, and retaining the spring under tension. Therefore when the restraint is removed from the spring 66 it will, due to its tensioned condition, pull the element 60 in such direction as to allow the spring to contract, but after the spring has contracted to the point where the strain in the spring is approximately zero, further motion of the inertia element 60 in the same direction is yieldingly opposed since the spring 66 is then placed under a compression load by the weight of inertia element 60.

The spring 66 is connected to a seat or stop 68, the latter including a portion 70 threaded in a bore 72 coaxial with the cylinder 62, and a stem 74 which is located in the cylinder. Connecting the spring 66 to the stem 74 is a slip fit junction, for example, a groove 76 in the stem 74 in which one or a part of one coil of the spring 66 is disposed. In this way the stop 68 may be adjusted by rotation in the bore 72 to regulate the action of the spring 66. The stop 68 is held in the adjusted position by the lock plug 80 which is threaded in the bore 72 in abutting relation with the seat 68. A pressure relief passage 82 controlled by a needle valve 84, opens into the cylinder 62 and is vented to the atmosphere in order to provide a dash pot type check for the mass 60 and also to vent the cylinder 62 preventing a complete air block of the mass from occurring.

A linkage connects the mass or inertia element 60 with the bracket 52, this linkage including a rocker 86 mounted on a pivot 88 which is located in the housing 14, and a pitman 90 connected with one end of the rocker 86 and a wing 92 fixed to the outer end of the plunger 60. A link 94 is pivoted to the opposite end of the rocker 86 and to the mounting bracket 52 at a place spaced from the axis of rotation of the bracket 52. Accordingly, the bracket 52 which may be considered as a part of the linkage, and hence the light reflecting member 48 fixed to it, are tilted in response to movement of the mass 60 axially of its cylinder 62.

One end of the bracket 52 is retained by the latch 96 in order to maintain the spring 66 under a slight tension load. The latch 96 includes a latch keeper 98 pivoted by a pin 100 to a suitable support 102 which is secured to and within the housing 14. The pin 100 is adjustable in a slot 104 provided in the support 102 so that the position of the latch keeper 98 with respect to the bracket 52 may be varied for adjustment of the tension under which the spring 66 is held.

The preferable means for actuating the latch are electrical, for example the solenoid motor 108 retained by a support 110 within the housing 14. The armature 112 of the motor 108 is made sufficiently long to extend to the latch keeper 98, to which it is pivoted by means of a pin 114, the latter being operable in a cam slot 116 formed in the latch keeper 98. Upon energization of the motor 108 the latch keeper 98 is released from the bracket 52 by having the armature 112 drawn into the motor casing against the opposition of a spring 120 which is disposed on the armature 112, the spring 120 bearing against an armature carried stop 122 and a seat 124 on the motor casing. Accordingly, the spring 120 constitutes means for withdrawing the armature 112 from the solenoid motor casing and retaining the latch keeper 98 engaged with the bracket 52.

After the housing 14 is fastened to the aircraft with the shade 36 and/or barrel 12 passed into the housing 14 through the aperture or light ray outlet 130 in the back panel 16, the device is ready for operation. When a missile is released from an aircraft under such flight conditions that there is little or no acceleration of the aircraft caused by change in flight direction, for reasons mentioned previously, the photographing of the missile from aircraft to target is not satisfactory. To obtain satisfactory pictures the optical axis of the camera 10 is depressed, this being done by closing a switch 134 which is wired to the motor 108, thereby energizing the motor. Switch 134 is located remotely of the housing 14 and may be connected to the camera control assembly to take advantage of the camera over-run arrangement where present, or mounted independently of the camera equipment for manual actuation.

Actuation of the motor 120 causes the latch keeper 98 to be swung free from the bracket 52 whereby the potential energy in the spring 66 is converted to kinetic energy, pulling the inertia element 60 within the cylinder 62 inasmuch as the spring 66 is normally held under a tension load by the latch keeper 98. The light deflecting member 48 being connected by the described linkage to the inertia element 60, is pivotally displaced about its pivot axis. Accordingly, a ray of light passing through the light ray passage having the frontal transparent panel 138 located in a light ray inlet, is deflected by the member 48 to the member 42 which directs it into the camera barrel 12. Therefore, the optical axis of the camera is depressed an amount proportional to the extent of pivotal movement of the member 48. Since the latter movement is governed by the spring 66, and it may be regulated by adjusting the stop 68, the effect of adjusting the stop is to vary the tension load in the spring 66 when held stretched by the holding action of the latch and linkage. Each instrument may be adjusted in this way, and also further adjustment may be made by manipulation of the needle valve 84, to control the dash pot action so that when the rocket or other missile is discharged from the aircraft under zero or near zero acceleration flight conditions, the frames will contain the missile even as the missile begins to separate from the aircraft.

Figure 4:
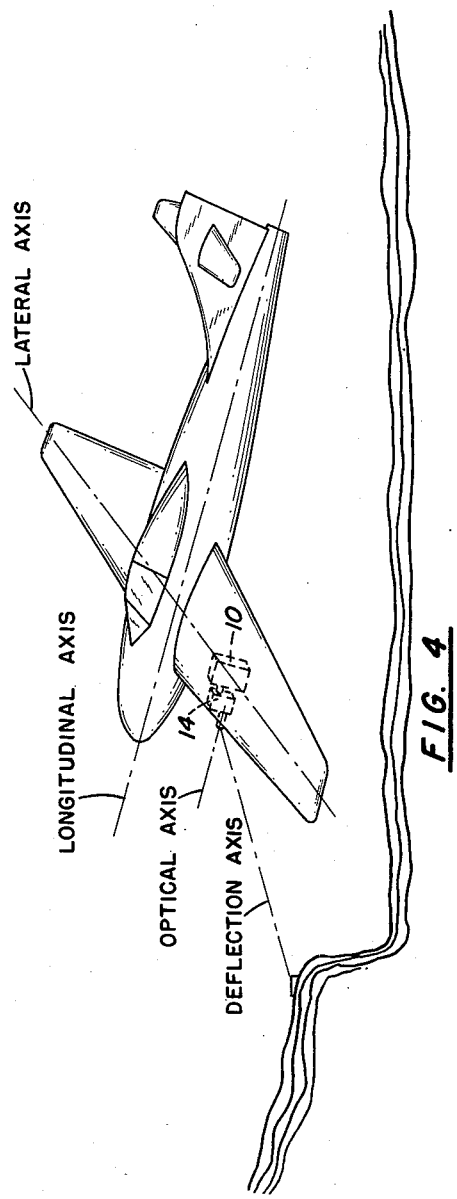
Fig. 4 is a perspective view showing the attachment and camera mounted in the wing of an aircraft and indicating how the optical axis of the camera is deflected from the normal due to the aircraft pulling up from a dive.

Assuming now, that the aircraft accelerates by nosing up after the missile is discharged as shown by Fig. 4, as would happen in the usual case, the inertia element or mass 60 will compress the spring 66 in view of the application of one of Newton's laws of motion. The accompanying motion of the inertia element 60 relative to the housing 14 causes additional tilting motion of the member 48 through the linkage and mounting brackets assembly. This last-mentioned motion is therefore responsive to acceleration of the housing 14 and causes the above referred-to arbitrarily selected ray of light to shift further, thereby providing for greater and continual camera optical axis shifting.

When the switch 134 is opened, the spring 120 moves the armature 112 outwardly of the motor casing, the armature movement lockingly engaging the latch keeper with the bracket 52 and holding it in such position that the spring 66 is stressed in tension. Thus the device is automatically reset for further operation.

It is understood that various changes may be made herein such as having the member 48 held stationary while the member 42 is movable, and therefore, limitation is sought only in accordance with the scope of the following claims.

The invention described herein may be manufactured and used by or for the Government of the United States of America for governmental purposes without the payment of any royalties thereon or therefor.

What is claimed is:

1. In an aircraft camera for mounting in any airplane with its optical axis normally substantially parallel to the longitudinal axis of the airplane, the combination of an attachment to shift said optical axis, said attachment comprising members having confronting reflecting surfaces, at least one member being in line with the camera lens axis and at least one member being pivotally mounted for movement about an axis perpendicular to said optical axis and parallel to the airplane lateral axis, acceleration responsive means for deflecting said movable member about its axis, said means comprising a spring biased mass operatively connected to said pivoted member and mounted to move along an axis parallel to the airplane vertical axis upon rotation of the airplane about an axis parallel to its lateral axis, whereby a change in directional movement of the airplane causes said spring biased mass to change its position, a latch releasably retaining said movable member against movement and said spring being prestressed to actuate said movable member a limited amount upon release of said latch.

2. In an aircraft camera for mounting in an airplane with its optical axis normally substantially parallel to the longitudinal axis of the airplane, the combination of an attachment to shift said optical axis, said attachment comprising first and second members having confronting reflecting surfaces, at least one member being mounted in line with the camera lens axis, means mounting said second member for pivotal movement about an axis perpendicular to said optical axis and parallel to the airplane lateral axis, a cylinder parallel to the aircraft vertical axis, a mass movably positioned in said cylinder, means connecting said mass to said second member, a seat at one end of said cylinder, a spring connected to said mass and anchored to said seat, releasable latch means normally holding said mass in a position such that said optical axis is undeflected and said spring is prestressed, whereby upon release of said latch means said mass will cause said second member to move to deflect said optical axis under action of said spring, and whereby upon rotation of the airplane about an axis parallel to its lateral axis, said mass will be moved to further move said second member and further deflect said optical axis.

3. The combination set forth in claim 2, and means communicating with said cylinder for damping vibration of said mass.

References Cited in the file of this patent
UNITED STATES PATENTS

| | | |
|---|---|---|
| 1,482,244 | Morton | Jan. 29, 1924 |
| 1,953,304 | Lutz | Apr. 3, 1934 |
| 2,142,350 | Drakoff | Jan. 30, 1939 |
| 2,460,163 | Bowen | Jan. 25, 1949 |
| 2,480,867 | Maris | Sept. 6, 1949 |

FOREIGN PATENTS

| | | |
|---|---|---|
| 958,615 | France | Sept. 19, 1949 |